US008597211B2

(12) United States Patent
Berlinger (10) Patent No.: US 8,597,211 B2
(45) Date of Patent: Dec. 3, 2013

(54) DETERMINATION OF INDICATOR BODY PARTS AND PRE-INDICATOR TRAJECTORIES

(75) Inventor: Kajetan Berlinger, München (DE)

(73) Assignee: Brainlab AG, Feldkirchen (DE)

( * ) Notice: Subject to any disclaimer, the term of this patent is extended or adjusted under 35 U.S.C. 154(b) by 991 days.

(21) Appl. No.: 12/622,002

(22) Filed: Nov. 19, 2009

(65) Prior Publication Data

US 2010/0160836 A1   Jun. 24, 2010

Related U.S. Application Data (60) Provisional application No. 61/150,148, filed on Feb. 5, 2009, provisional application No. 61/232,505, filed on Aug. 10, 2009.

(30) Foreign Application Priority Data

Nov. 19, 2008  (EP) .................................... 08169422
May 13, 2009  (EP) .................................... 09160153

(51) Int. Cl.
*A61B 5/11* (2006.01)
*G08B 23/00* (2006.01)
(52) U.S. Cl.
USPC ...................................... 600/595; 340/573.1

(58) Field of Classification Search
USPC .......... 378/62, 63, 64, 65; 600/407, 411, 414, 600/424, 425, 426, 427
See application file for complete search history.

(56) References Cited

U.S. PATENT DOCUMENTS

2008/0039713 A1* 2/2008 Thomson et al. ............. 600/411

OTHER PUBLICATIONS

Kajetan Berlinger, "Fiducial-Less Compensation of Breathing Motion in Extracranial Radiosurgery", Dissertation, 2006.
Lin et al., "Tumor Targeting for Lung Cancer Radiotherapy Using Machine Learning Techniques", Machine Learning and Applications, 2008, pp. 533-538.
Schweikard et al., "Fiducial-Less Respiration Tracking in Radiosurgery", Lecture Notes in Computer Science, vol. 3217, No. 1, Jan. 2004, pp. 992-999.

* cited by examiner

*Primary Examiner* — Hoon Song
*Assistant Examiner* — Danielle Fox
(74) *Attorney, Agent, or Firm* — Renner, Otto, Boisselle & Sklar, LLP

(57) ABSTRACT

The present application relates to a method for determining an indicator body part subject to vital movement that is not to be irradiated and that serves as an indicator of the change in position of a body part subject to vital movement that is to be irradiated, in particular a tumor in an anatomical body. The method can further include determining an indicator trajectory that describes the vital movement of the indicator body part.

16 Claims, 5 Drawing Sheets

Displacement

Deformation

→ Apply displacement and deformation to tumor trajectory

DETERMINATION OF INDICATOR BODY PARTS AND PRE-INDICATOR TRAJECTORIES

RELATED APPLICATION DATA

This application claims priority of U.S. Provisional Application No. 61/150,148 filed on Feb. 5, 2009 and U.S. Provisional Application No. 61/232,505 filed on Aug. 10, 2009, each of which is incorporated herein by reference in its entirety.

FIELD OF THE INVENTION

The present invention relates to the determination of indicator body parts and pre-indicator trajectories which may in particular be used in the irradiation of body parts which are barely or not at all detectable in analytical images.

Reference is made to the application EP 08 169 422.6, from which priority is claimed, and the corresponding U.S. application US-61/150,148. Disclosure of these applications is made herein by reference.

SUMMARY OF THE INVENTION

Advantageously, the subject matter of the invention makes it possible to determine the position of a partial region or partial volume of an anatomical body, wherein the partial region or partial volume is a body part subject to vital movement that is to be irradiated. Advantageously, determining the position of the partial region or partial volume makes it possible to take account of a change in position that is caused by vital movement in the body parts subject to vital movement, by controlling a treatment beam.

The independent claims describe the subject matter of the invention. The dependent claims refer to advantageous embodiments.

Advantageously, the subject matter of the invention makes it possible to determine an indicator body part and/or a pre-indicator trajectory.

The body part is in particular an anatomical body part, that is to say a part of an anatomical body. Advantageously, the invention is used in particular when a body part is to be irradiated. For example, the body part to be irradiated is pathogenic tissue such as a tumor. For this reason, terms that are related to the body part to be irradiated will be designated purely by way of example by the term "target" below.

During the irradiation procedure, the position of a body part subject to vital movement changes. In general terms, the term "position" herein includes a two-dimensional meaning and refers to the position in a two-dimensional image that is described by analytical data, and also includes a three-dimensional meaning and refers to the position in three-dimensional space, such as may be described for example by a reference system. The indicator body parts and/or pre-indicator trajectories are used to take account of the change in position that is caused in particular by the vital movement of the body parts subject to vital movement. In particular, control of a treatment beam for treating a body part that is to be irradiated (e.g. a tumor) may be based on the determined indicator body parts and/or pre-indicator trajectories.

The term "subject to vital movement" means that the body parts are moved by vital functions of the body such as respiration and/or heartbeat. These functions of the body sustain life. The thereby generated movements of parts of the body such as ribs or soft tissue may be disruptive during the irradiation of body parts such as a tumor. The deliberate suppression of respiration, which represents a considerable part of vital movement, is only possible for a limited time. It would thus be desirable to have information available that allows conclusions to be drawn about the vital movement of the tumor in order to plot a treatment beam such that the latter hits the tumor throughout the entire irradiation procedure, which in particular lasts longer than a respiration cycle.

The indicator body parts are body parts that are caused to move in particular by those vital functions of the body that also cause the target (tumor) to move. The assumption is therefore made that the indicator body parts perform a movement that is similar to the movement performed by the body part to be irradiated (target). In particular, it is assumed that there is a correlation between the two movements.

According to the invention, pre-analysis data is used in order to determine at least one indicator body part and/or at least one pre-indicator trajectory in particular before the actual irradiation procedure. Once an indicator body part and/or a pre-indicator trajectory is determined, then, based on this, the treatment beam can be controlled during the actual irradiation procedure and in particular it is possible to control which partial volume of the body the irradiation beam is to pass through. Preferably, this is the partial volume in which the body part subject to vital movement that is to be irradiated is (probably) located. The position of the partial volume that is to be irradiated is preferably determined by means of a data processing method. This data processing method preferably uses information that is obtained during irradiation about the position of the indicator body part and/or information about the course of the pre-indicator trajectories during irradiation and information, determined beforehand, on the correlation between the position of the indicator body part and the body part to be irradiated, and/or information on the correlation between a pre-indicator trajectory that is determined during irradiation and the trajectory of the body part subject to vital movement that is to be irradiated. In other words, information that is available before irradiation and is based on so-called pre-analysis data is used to evaluate information that is obtained during irradiation and gives indications of the position of the body part to be irradiated. In this way, a high level of accuracy can be achieved when controlling the treatment beam, and hence in particular both the stress of irradiation on the patient can be reduced and the efficiency of the radiation treatment can be increased.

The above-mentioned pre-analysis data here is in particular data that is obtained by medical analytical methods in particular before treatment. These medical analytical methods are, for example, X-ray diagnostics, magnetic resonance analysis, ultrasound analysis, etc. This pre-analysis data preferably comprises data that describes with temporal resolution the position of the body part subject to vital movement that is to be irradiated and at least one body part subject to vital movement that is not to be irradiated, in particular in three-dimensional space. In particular, the temporal resolution is such that the changes in position caused by the vital movements can be derived from the pre-analysis data. The time intervals between the individual descriptions of the positions of the body parts are in particular less than one minute or less than 5 seconds. The pre-analysis data in particular describes a region of the body with spatial resolution, for example a patient's ribcage, inside which are the body part subject to vital movement that is to be irradiated and the body parts subject to vital movement that are not to be irradiated. A concrete example of pre-analysis data is that data which is obtained from so-called four-dimensional computer tomography, wherein the four dimensions comprise three spatial dimensions and time. The spatial resolution of the pre-analysis data is preferably less than one centimeter, in particular less than one millimeter. The pre-analysis data has the advantage over the so-called inter-analysis data, which may be obtained just before or during irradiation, that it contains more information (in particular because of the higher spatial and/or temporal resolution). This greater amount of information can be obtained in particular by a longer measuring time and the absence of spatial constraints caused by the irradiation equipment. This greater amount of information is advantageously used by the present invention to control the irradiation procedure.

Based on the pre-analysis data, a so-called pre-target trajectory is preferably determined. This pre-target trajectory describes the trajectory (and thus in particular the course of the curve in space) of the body part subject to vital movement that is to be irradiated, wherein this pre-target trajectory results from the pre-analysis data. As already mentioned above, the inter-analysis data contains less information because of the temporal and spatial conditions prevailing, and in particular is only two-dimensional in space. As a result, during irradiation the position of the body part subject to vital movement that is to be irradiated can only be determined to a limited extent or not at all, and in particular unreliably. It would therefore be desirable to identify another body part beforehand, herein designated the indicator body part, whereof the position in relation to the body part subject to vital movement that is to be irradiated has been determined and whereof the position can also be (reliably) determined during irradiation from the inter-analysis data, and whereof the position throughout a complete vital movement cycle correlates in known manner with the position of the body part subject to vital movement that is to be irradiated.

However, whether a body part subject to vital movement that is not to be irradiated is suitable as an indicator body part depends in particular on whether it performs a movement that is related to the body part subject to vital movement that is to be irradiated. Advantageously, according to the invention at least one candidate trajectory is therefore determined. Advantageously, a check is carried out to see whether this (at least one) candidate trajectory is suitable as an indicator trajectory.

Once at least one candidate trajectory is obtained, then advantageously, based on the at least one candidate trajectory and the pre-target trajectory, the at least one candidate body part that is associated with the at least one candidate trajectory is determined as the indicator body part. "Association" of a candidate body part with a candidate trajectory means that the candidate body part generates the candidate trajectory from its change in position. Preferably, as an alternative or in addition to the above-mentioned determination, at least one of the candidate body parts is determined as the indicator body part and/or one of the at least one candidate trajectories is determined as the pre-indicator trajectory. The case may arise that no candidate trajectory can be determined as a pre-indicator trajectory and no candidate body part can be determined as an indicator body part. In particular in this event, based on the at least one candidate trajectory and the pre-target trajectory, it is determined that none of the candidate body parts may be determined as an indicator body part and/or none of the candidate trajectories may be determined as a pre-indicator trajectory. The latter may for example be the case if the determined candidate body parts do not change their position over time and so in particular are not correlated with the change in position of the body part subject to vital movement that is to be irradiated.

The above-mentioned determination of the indicator body part and/or the pre-indicator trajectory is preferably based on a comparison of the at least one candidate trajectory with the pre-target trajectory. In particular, based on the comparison, it is determined whether there is a relationship between the at least one candidate trajectory and the pre-target trajectory. In particular, it is determined whether there is a correlation between the candidate trajectory and the pre-target trajectory. If this relationship, in particular a correlation, exists, the candidate body part may be determined as an indicator body part and/or the candidate trajectory may be determined as a pre-indicator trajectory. However, other or additional preconditions may be attached to this determination, as also explained below. In particular, such preconditions are the closeness of the correlation between the at least one candidate trajectory and the pre-target trajectory and/or the trackability of the at least one candidate body part during the vital movement. The term "trackability" will be explained below.

To enable determination based on "trackability", preferably inter-analysis data is simulated on the basis of the pre-analysis data. To this end, in particular assumptions are made about the conditions prevailing during the generation of inter-analysis data (in particular during the irradiation procedure). As stated above, the inter-analysis data describes in particular changing positions of the body parts that are not to be irradiated. As stated above, the inter-analysis data typically contains less information. This can result in the (changing) positions of only some of the body parts that are not to be irradiated being capable of determination on the basis of the inter-analysis data. In particular, this can also result in the positions of the body parts that are not to be irradiated being capable of determination only at certain times or periods within the period that is affected by vital movement.

Once the inter-analysis data, which represents in particular two-dimensional inter-analysis data, has been simulated, in particular the at least one candidate trajectory can be determined on the basis of the simulated inter-analysis data. Here, determining the at least one candidate trajectory thus means in particular determining a candidate trajectory that results from the simulated inter-analysis data. As will be explained below, this may be a two-dimensional trajectory of a candidate body part, for example in a two-dimensional image (e.g. an X-ray image) that is described by the inter-analysis data or, to be more precise, the simulated inter-analysis data. However, it is also possible to determine a three-dimensional candidate trajectory that can be determined from the simulated inter-analysis data. In particular, it is possible to determine three-dimensional candidate trajectories from the simulated inter-analysis data if the inter-analysis conditions describe the recording of two-dimensional images from different directions, as will be described below in more detail. Needless to say, three-dimensional candidate trajectories according to an embodiment can also be determined directly from the pre-analysis data without going via the simulated analysis data. That means that the three-dimensional candidate trajectories are not based on the simulated inter-analysis data. They are generated for example by selecting a partial volume (VOI) from the analysis volume at a particular point in time. The selected partial volume is then "tracked" in the sequence of the three-dimensional analysis volume that is described by the pre-analysis data, by a tracking method. Selection of the partial volume may be performed for example by a search or scanning algorithm, as described below (in connection with a sequence of two-dimensional images), with the result that in particular the entire analysis volume is scanned by partial volumes (in particular at a particular point in time). Once three-dimensional candidate trajectories have been determined in this way, at least one of them is selected as the indicator trajectory. The selection is based in particular on the criteria described herein, that is to say for example the candidate trajectory that has the closest correlation with the pre-target trajectory is selected. The indicator body part that is associated with at least one indicator trajectory may then undergo a further selection, that is to say serve in particular as a candidate body part for further selection procedures as described herein. In particular, this selection may be based on the simulated inter-analysis data, as described below.

Preferably, a three-dimensional candidate trajectory that has been determined for example in one of the ways described above is used in determining the pre-indicator trajectory and/or indicator body part. Preferably, moreover, the three-dimensional pre-target trajectory that is in particular obtained directly from the pre-analysis data and not from the simulated inter-analysis data is used in determining the pre-indicator trajectory and/or the indicator body part. According to an embodiment, however, it is possible also to determine the pre-target trajectory, which is used to determine the pre-indicator trajectory and the indicator body part, on the basis of the simulated inter-analysis data. According to a further embodiment, it is possible to determine the pre-indicator trajectory and the indicator body part on the basis of two-dimensional candidate trajectories that have been determined on the basis of the simulated inter-analysis data and in particular also on the basis of a two-dimensional pre-target trajectory that was determined on the basis of the simulated inter-analysis data. The above-mentioned determinations are preferably in turn performed by a comparison of the candidate trajectories with the pre-target trajectory, in particular by establishing a relationship between these trajectories, in particular by determining a correlation. In particular, it is possible to calculate from the pre-analysis data and the analytical conditions the course of a two-dimensional pre-target trajectory in one or more images (in particular images that have been obtained from particular recording directions). These two-dimensional pre-target trajectories can then be compared with the simulated two-dimensional candidate trajectories, in particular to determine the correlation. In particular, this comparison can be performed separately for the two-dimensional simulated inter-analysis images that correspond to the different recording directions. In particular, the candidate body parts or candidate trajectories may be taken into account as an indicator body part and/or pre-indicator trajectory only if similar correlations are apparent for the two-dimensional candidate trajectories that are associated with different recording directions, but the same candidate body part.

The above-mentioned application EP 08 169 422.6 (or U.S. 61/150,148), from which priority is claimed, discloses a tracking method, in particular a tracking algorithm for tracking body parts. The position of body parts subject to vital movement may be determined by the tracking method that is described there. In the method that is described there, a search is performed for a part of an image, which is described as a procedure region, in an image at a later point in time, in particular using similarity criteria. If a similar procedure region is found, the tracking is successful. The tracking method that is described there represents only one example of a tracking method. Any desired tracking methods, in particular tracking algorithms that are based on similarity criteria, may be used. In particular, search algorithms may be applied to find and thus "track" a body part, which is described by an image segment from a first image at a first point in time, in a second image at a second, later point in time. In particular, the procedure of tracking is to be simulated herein. Thus, in particular following of the body parts by means of the tracking method, in particular tracking algorithm, is to be simulated when the latter is applied to the inter-analysis data, which on the basis of the simulation change with time. The term "tracking" thus designates following the body parts using the simulated inter-analysis data. Although the inter-analysis data was generated in the past, the term "tracking" is preferred to the term "tracing", since it involves simulation of the generation of inter-analysis data in the present and the application of the tracking algorithm to this inter-analysis data that is apparently generated in the present.

Preferably, herein the same tracking method, in particular the same tracking algorithm, is applied as that which is to be applied later during the irradiation procedure during generation of the real inter-analysis data. In this way, it is in particular possible to simulate whether tracking during the irradiation procedure on the basis of the real inter-analysis data is successful. If such tracking of a body part is successful, this body part is designated herein as "trackable". The body part then displays "trackability".

Preferably, only those body parts that are not to be irradiated and are trackable by the tracking algorithm applied to the simulated inter-analysis data are taken into account as indicator body parts. In this way, in particular those body parts that are not to be irradiated and which, although their movement displays a correlation with the movement of the body part subject to vital movement that is to be irradiated, are highly probable not to be trackable sufficiently or at all during the irradiation procedure may be eliminated as indicator body parts.

Preferably, according to the invention a plurality of indicator body parts and/or a plurality of pre-indicator trajectories may be determined. This has the advantage that during the irradiation procedure control based on the indicator body parts and/or the pre-indicator trajectories may be performed with more stability and reliability. In particular, during the actual irradiation procedure indicator body parts that deviate in their movement behavior from the plurality of indicator body parts and/or are not trackable sufficiently or at all during the irradiation procedure can no longer be used to control the treatment beam.

The simulated inter-analysis data may be resolved three-dimensionally in space and in time. In particular, the spatial resolution and/or the temporal resolution may be lower than in the pre-analysis data. According to a preferred embodiment, the simulated inter-analysis data is spatially two-dimensional and describes with temporal resolution the positions of both the body parts that are to be irradiated and those that are not to be irradiated in a surface, for example by means of a two-dimensional image (e.g. an X-ray image). It is possible that the body parts are not visible at all times. The positions of such body parts are thus only described by the inter-analysis data at certain times. It is also possible that the inter-analysis data describes only some of the positions of the body parts described by the pre-analysis data. In particular with two-dimensional recorded images, it is possible that the body parts are at least at certain times concealed by other body parts.

Preferably, two-dimensional candidate trajectories are determined from the simulated two-dimensional inter-analysis data. The candidate trajectories that were used above to determine the pre-indicator trajectories and/or indicator body part may thus be three-dimensional and/or two-dimensional candidate trajectories. The two-dimensional candidate trajectory describes the vital movement of the at least one candidate body part in the surface. Since the vital movements are in particular cyclic movements, the trajectories (two-dimensional and/or three-dimensional trajectories) are in particular closed systems. Preferably, only those two-dimensional or three-dimensional candidate trajectories (and/or the associated candidate body parts) that have a closed trajectory are used for determination as a pre-indicator trajectory (and/or indicator body part).

Preferably, at least one candidate trajectory is determined. This determination is preferably performed by applying the tracking algorithm to the simulated inter-analysis data. In particular, the determination is performed such that a candidate body part is determined in the simulated inter-analysis data. The inter-analysis data in particular includes a sequence of individual images (in particular two-dimensional individual images). An individual image is selected from this sequence. From this individual image, a partial region is selected for example on the basis of particular criteria or following a particular search algorithm or a strict search order that describes a step-by-step scan of the entire image. This partial region is then the candidate body part. This candidate body part is then tracked by means of the tracking algorithm in the other individual images in the sequence. In this way, the candidate trajectory is obtained (if the candidate body part is trackable).

In particular, the candidate body parts may be determined as follows. The pre-analysis data is three-dimensional in space and describes different points in time, in particular one or more cycles of one or more vital movements (for example caused by respiration or heartbeat). From this three-dimensional space, a volume is selected in particular following particular rules. These rules may follow a search algorithm that selects partial regions that contrast one another particularly highly, for example. It is also possible to proceed such that the entire volume is scanned step by step, in particular at a particular point in time, by partial volume (also called VOI herein) in accordance with a search order. By simulating the inter-analysis data, it is then possible to determine which two-dimensional partial region (also called ROI herein) in the simulated two-dimensional image that is described by the simulated inter-analysis data corresponds to the partial volume (VOI). This two-dimensional partial region is then the candidate body part. This candidate body part then serves as the starting point for the tracking algorithm, which attempts to track the candidate body part in the sequence of two-dimensional analytical images that are described by the simulated inter-analysis data. This means that the tracking algorithm attempts to identify the candidate body part in the respective individual successive two-dimensional images, at the different points in time described by the sequence. The sequence of candidate body parts that are found in the sequence of two-dimensional images then describes the candidate trajectory. As described above, those partial volumes (VOIs) whereof the corresponding two-dimensional partial regions (two-dimensional candidate parts) are not trackable by the tracking algorithm can be eliminated as indicator body parts. This is because it may be assumed of these untrackable candidate parts that they will not be trackable during the real measurement procedure either.

Preferably, the inter-analysis data is simulated on the basis of the inter-analysis conditions. These inter-analysis conditions describe the conditions under which analysis is to be performed. In particular, they describe the conditions under which a three-dimensional space (analysis volume) is examined by means of an analytical device such that this analytical device supplies a two-dimensional result of analysis for this space (analysis volume). The two-dimensional partial region (ROI) that corresponds to the three-dimensional partial region (VOI) is the two-dimensional result of analysis of the three-dimensional partial region (VOI). In particular, the inter-analysis conditions describe recording directions in relation to the three-dimensional analysis volume that is described by the pre-analysis data. In particular, the inter-analysis conditions describe how a two-dimensional X-ray image can be simulated from the three-dimensional pre-analysis data in particular recording directions. The inter-analysis conditions thus in particular describe the imaging geometry (e.g. recording directions) during the simulated generation of the simulated analytical images that are described by the simulated inter-analysis data. Furthermore, analytical conditions data that describes the analytical conditions may include information on the position of an analytical source (e.g. X-ray source) and/or the position of an analytical detector (X-ray detector) in relation to one another and/or to the volume for analysis. The analytical conditions data that describes the imaging condition thus preferably includes information that enables the position of a source of the analytical beams and/or waves (e.g. the X rays) to be calculated in relation to an image surface. Regarding the relationship between three-dimensional analytical objects and two-dimensional analytical images, which is defined by the imaging geometry, reference is in particular made to the following publications:

1. "An Efficient and Accurate Camera Calibration Technique for 3D Machine Vision", Roger Y. Tsai, Proceedings of IEEE Conference on Computer Vision and Pattern Recognition, Miami Beach, Fla., 1986, pages 364-374
2. "A versatile Camera Calibration Technique for High-Accuracy 3D Machine Vision Metrology Using Off-the-Shelf TV Cameras and Lenses", Roger Y. Tsai, IEEE Journal of Robotics and Automation, Vol RA-3, No 4, August 1987, pages 323-344. See also http://www.cs.cmu.edu/~rgw/TsaiDesc.html
3. Publication by Ziz Yaniv, "Fluoroscopic X-ray Image Processing and Registration for Computer-Aided Orthopedic Surgery"

As stated above, preferably at least two two-dimensional simulated inter-analysis data points that describe at least two two-dimensional analytical images are determined. These are simulated for example assuming at least two different recording directions. The assumed recording directions (in relation to the analysis volume) preferably correspond to the real or planned recording directions that prevailed or are to prevail during the irradiation procedure. Preferably, for each recording direction from which the two-dimensional analytical images are to be obtained, a sequence of two-dimensional analytical images is determined. If a candidate body part is determined for an individual image in a sequence, as for example described above, a tracking algorithm may be applied to this sequence. According to an embodiment, one partial region (ROI) is determined in each image (for example the first image) of each sequence, which in each case corresponds to a different recording direction. This partial region (ROI) corresponds to a candidate body part. For example, the images in a first sequence have been obtained from a (simulated) first recording direction by means of simulation, and the particular partial region (ROI) represents a partial volume (VOI) as seen from the (simulated) first recording direction. The images in a second sequence were obtained by means of simulation from a (simulated) second recording direction, and a partial region (ROI) that was determined in the first image of the second sequence represents the same partial volume (VOI) as seen from the (simulated) second recording direction. This means that the candidate body part that is determined in each case is preferably determined on the basis of only a single partial volume (VOI) of the analysis volume at a particular single point in time. The partial regions (ROIs) in the analytical images that were obtained from different simulated recording directions thus represent different views of the same partial volume (VOI) in the analysis volume at a particular single point in time, the views having been taken from different recording directions. The tracking algorithm is now preferably applied separately to the respective sequence of two-dimensional analytical images, with each image in the sequence corresponding to a different point in time. In this way, a candidate trajectory that corresponds to the sequence of candidate body parts in the sequence of two-dimensional simulated inter-analysis images corresponding to a recording direction is obtained for each recording direction. On the basis of the analytical conditions, it is now possible to check whether the candidate trajectories at each individual point in time, that is for each individual image in the sequence, can derive from the same partial volume of the analysis volume. This check may in particular be performed by applying rearward extrapolation and/or by applying the principles of epipolar geometry, and in particular the information described above on the imaging geometry and the described relationship between three-dimensional analytical objects and two-dimensional analytical images may be used. For each set of images that includes at least two analytical images, it is therefore possible to check whether the respective candidate body parts (partial regions of the two-dimensional analytical image) can be generated from a single partial volume (VOI) of the analysis volume by simulating analysis under the assumed inter-analysis conditions by means of simulation. The set of at least two analytical images describes the same analysis volume (VOI) at a particular single point in time from different recording directions. Each analytical image of the set is in this case associated with a different sequence of analytical images. If the check gives a negative result, that is if the analytical images cannot have been generated from a single partial volume, it is assumed that there is a high risk that tracking during the real irradiation procedure will fail. The candidate body parts and/or candidate trajectories leading to the negative result are preferably therefore rejected and not used for the determination as an indicator body part and/or pre-indicator trajectory.

An indicator body part or a plurality of indicator body parts, as described below, may be selected from a plurality of candidate body parts. Correspondingly, a pre-indicator trajectory may be selected from a plurality of candidate trajectories, or a plurality of pre-indicator trajectories may be selected from a plurality of candidate trajectories, as follows. For the selection, the candidate trajectories are preferably compared with the pre-target trajectory. This comparison includes, in particular, determining the correlation between the candidate trajectory and the pre-target trajectory. Preferably, the closer this correlation, the more likely is a candidate trajectory to be selected as a pre-indicator trajectory. In particular, a threshold may be predetermined below which a candidate trajectory (and the candidate body part associated therewith) is rejected as pre-indicator trajectory (and as indicator body part). This threshold describes the closeness of the correlation, and when it is exceeded a candidate trajectory is preferably selected as the pre-indicator trajectory. Correspondingly, the candidate body part that corresponds to the candidate trajectory (the associated candidate body part) is selected as the indicator body part.

Determining the correlation may be performed for example in two-dimensional or three-dimensional space. If the correlation is determined in three-dimensional space, then in particular the candidate trajectories are determined in the three-dimensional analysis volume that is described by the pre-analysis data. In order to determine the plurality of candidate trajectories, it is possible here too for example to proceed such that partial volumes (VOIs) are selected step by step from the analysis volume present at a single point in time, in order thus to scan the entire volume step by step. Here too, a search algorithm as mentioned above, which for example selects partial regions (VOIs) that contrast one another particularly highly, may be used. Once such a partial volume (VOI) is available, the trajectory of this partial volume is determined as a three-dimensional candidate trajectory. To determine the trajectory, the partial volume (VOI) present at a point in time is sought in the partial volumes present at other points in time, such that a sequence of partial volumes results, forming the trajectory. The determined three-dimensional candidate trajectory is then compared with the pre-target trajectory in order to determine the correlation. A corresponding procedure may be performed in two-dimensional space. Here, a two-dimensional candidate trajectory is then determined for example on the basis of the simulated inter-analysis data. This two-dimensional candidate trajectory can then be compared with the simulated two-dimensional pre-target trajectory that was determined on the basis of the simulated inter-analysis data, in order to determine the correlation. The tracking algorithm may be used to determine the two-dimensional candidate trajectory. However, it is also possible to determine the two-dimensional candidate trajectory on the basis of the analytical conditions (recording directions) from the sequence of partial volumes (VOIs). Accordingly, when determining the two-dimensional pre-target trajectory, recourse may be had to the tracking algorithm. However, this may fail since the body parts to be irradiated are frequently difficult to track. For this reason, a two-dimensional pre-target trajectory is preferably determined on the basis of the sequence of partial volumes that correspond to the body part subject to vital movement that is to be irradiated, taking into account the analytical conditions (recording directions).

Once the correlation has been determined in the above-mentioned manner, the determined correlation is preferably used during the (real) irradiation procedure in order to determine the position of the body part to be irradiated on the basis of the indicator body part and/or the pre-indicator trajectory. Here, it is assumed that the correlation has not changed if the situation at the time of recording the pre-analysis data is compared with the situation during irradiation. However, it may happen that the correlation has changed. For example, the patient may display different respiratory behavior. For this reason, real inter-analysis data is collected in particular just before irradiation. This may be three-dimensional and preferably two-dimensional real inter-analysis data that describes a sequence of two-dimensional real analytical images. At least one partial region (ROI) that was determined previously on the basis of the pre-analysis data and corresponds to an indicator body part is preferably sought in a single two-dimensional analytical image of the sequence, in particular on the basis of similarity criteria. The tracking algorithm is then applied to determine the sequence of partial regions (ROIs) in the sequence of two-dimensional analytical images. The trajectory of the indicator body part is thus determined on the basis of the real inter-analysis data. Because this trajectory is obtained in particular just before the actual irradiation procedure, it is also designated the inter-indicator trajectory herein. This is compared with the pre-indicator trajectory, which is in particular two-dimensional and is in particular based on the simulated analytical data. On the basis of this comparison, the correlation that has been described so far and has already been determined beforehand, which is also designated the pre-correlation herein, is corrected in order to determine an updated correlation, which occurs in particular just before irradiation and is designated inter-correlation. The pre-correlation results from a comparison between the pre-indicator trajectory and the pre-target trajectory.

According to another alternative procedure, in which in particular there are at least two recording directions, the three-dimensional inter-indicator trajectory is compared with the pre-target trajectory to determine the inter-correlation.

Once the inter-correlation is determined, it is then preferably used to control the position of the treatment beam, taking into account the respectively current position of the indicator body part. Furthermore, there are two possibilities here for determining the inter-correlation. According to one possibility, which was described above, it is assumed that the pre-target trajectory of the body part to be irradiated has not changed. However, this assumption is rather improbable since, if the change in trajectory was caused for example by a change in the patient's respiration, it may be assumed that the pre-target trajectory (tumor trajectory) has changed accordingly. According to a further embodiment, the pre-indicator trajectory is compared with the inter-indicator trajectory, and on the basis of this comparison, which in particular includes determining the change in the trajectory, the pre-target trajectory is changed (accordingly). This changed trajectory is designated the inter-target trajectory herein. In particular, the pre-target trajectory may be changed such that it includes a similar deformation (in particular, a similar broadening or constriction) and/or a similar displacement of the trajectory. For example, an elastic model of the trajectory may be taken as the basis and an elastic deformation of the trajectory assumed. The inter-correlation then preferably describes the correlation between the inter-target trajectory and the inter-indicator trajectory.

According to a further embodiment, in addition or as an alternative to the above-mentioned procedure comprising a plurality of determined inter-indicator trajectories, that inter-indicator trajectory that has changed the least may be selected as that which is to be used for later control of the treatment beam, that is to say the one in which there is the smallest difference between the pre-indicator trajectory and the inter-indicator trajectory.

According to a further embodiment of the invention, which can be combined with the preceding embodiments, data of vital functions is collected and used for the method according to the invention. The data of vital functions describes vital parameters such as the pulse and/or respiration, in particular the amplitude and/or frequency of the pulse and/or respiration. In particular, the data of vital functions includes the amplitude of the vital parameter as a function of time. Preferably, the data of vital functions includes an association with the analytical data. Thus, in particular data of vital functions is associated with the respective (two-dimensional or three-dimensional) analytical images. That data of vital functions that is associated with the pre-analysis data is designated pre-data of vital functions. That data of vital functions that is associated with the real inter-analysis data is called inter-data of vital functions. The inter-data of vital functions thus describes the vital parameters before or during irradiation, in particular just before irradiation.

Preferably, the pre-indicator trajectory is determined as a function of the vital parameters, the determination being based on the pre-data of vital functions and in particular being based on the respective association of the pre-data of vital functions with the individual three-dimensional analytical images that are described by the pre-analysis data. In particular, the position of the indicator body part is determined as a function of the amplitude and/or frequency of the vital parameter described by the data of vital functions. Thus, if in particular the indicator trajectory, in particular the shape of the indicator trajectory, is described as a function of the vital parameters, in particular as a function of the amplitude and/or frequency of the vital parameters, then on the basis of the inter-data of vital functions the pre-indicator trajectory is preferably corrected, the corrected pre-indicator trajectory being designated the vital indicator trajectory. If for example the amplitude of respiration before irradiation is smaller than during generation of the pre-analysis data, then the vital indicator trajectory is determined such that it moves through a smaller range of movement. On the basis of the vital indicator trajectory, the correlation between the vital indicator trajectory and the pre-target trajectory is then also corrected, the corrected correlation being designated the vital correlation. On correlation, the starting point may once again be the assumptions described in analogous manner above. Either it is assumed that the pre-target trajectory does not change with changes to the data of vital functions, or for example it is assumed that it also changes. In the latter case, an elastic model may once again be the starting point. In particular, the pre-target trajectory may be described as a function of the pre-data of vital functions. In that case, on the basis of the inter-data of vital functions, the pre-target trajectory can be corrected, wherein the corrected pre-target trajectory is designated the vital target trajectory and describes the trajectory (of the tumor) to be anticipated for the current inter-data of vital functions. The vital target trajectory that is determined in this way can then in turn be compared with the vital indicator trajectory to determine the vital correlation. The vital correlation may in particular also be calculated, and in particular corrected, during irradiation as a function of the current inter-data of vital functions. This vital correlation may then form the basis for determining the position during irradiation of the body part to be irradiated, based on the position during irradiation of the indicator body part and the vital correlation, with the vital correlation describing an association between the position of the indicator body part and the position of the body part to be irradiated. The treatment beam is in particular controlled on the basis of the determined position of the body part to be irradiated. The vital correlation may thus be used during irradiation as an alternative to the described inter-correlation to determine the position of the body part to be irradiated, or it may also be combined with the inter-correlation for example by averaging, which may also be performed with weighting. Deviations between the vital correlation and the inter-correlation may also be used to eliminate candidate body parts or indicator body parts (and their associated trajectories) as unsuitable for determination.

According to a further embodiment, the pre-data of vital functions and the inter-data of vital functions are compared with one another. On the basis of the comparison, alerts are output. In particular, alerts are output if there are deviations between the pre-data of vital functions and the inter-data of vital functions. These alerts may be acoustic, visual and/or tactile. In particular, the extent of the deviation may be displayed. In this way, a patient can be trained to perform his or her own irradiation with approximately the same vital parameters as were present during generation of the analytical image. Thus, it may be assumed with a relatively high level of reliability that there is the same correlation between the indicator trajectory used to control the treatment and the pre-target trajectory as there was when the pre-analysis data was obtained. It is also possible for the alerts to be used by an operative of the irradiation equipment to delay the start of irradiation until similar vital parameters to those that were present when the pre-analysis data was obtained have been established.

The invention further relates to a program, in particular a computer program, that on running on a computer or being loaded onto a computer causes the computer to perform the method that is described above. The invention further relates to a program memory, in particular an electronic or magnetic or optical program memory on which the program is stored. The invention further relates to a signal wave, as transferred for example over the internet and carrying information that represents the program. The invention further relates to a computer, in particular an electronically programmable computer, on which the program runs or into the memory whereof the program is loaded.

Further, the invention relates to a treatment beam system that includes a treatment device. This treatment device is constructed to emit a treatment beam in order to irradiate the body part subject to vital movement that is to be irradiated. The treatment system further includes the above-mentioned computer. This computer preferably includes a data interface, in order to output control data, which is used to control the treatment beam, to a control device. This control data that is output for the purpose of control in particular includes at least one of the following types of data, or is calculated on the basis of at least one of the following types of data: at least one (pre-, inter- and/or vital) indicator trajectory; at least the position of an indicator body part; correlation data that describes the (pre-, inter- and/or vital) correlation. Preferably, the position of the target is calculated on the basis of the position of the at least one indicator body part and the correlation. This position of the at least one indicator body part, which is used for calculation, is preferably determined on the basis of the real inter-analysis data, which is obtained in particular during the irradiation procedure. This position thus preferably describes the current position of the at least one indicator body part during the irradiation procedure. The correlation used for calculation preferably includes an association between this (current) position of the indicator body part and the position of the target, e.g. in the form of a look-up table. Determining the correlation described herein includes in particular determining this association. The treatment beam system includes the said control device for controlling the position of the treatment beam on the basis of the control data that is transferred over the data interface. Further, the treatment control system preferably includes an analytical device for generating real inter-analysis data, which is preferably fed to the computer and/or the control device. Preferably, the method according to the invention calculates the control data on the basis of the determined correlation, which is described by correlation data and the real inter-analysis data. On the basis of the real inter-analysis data, the current position of the indicator body part is determined, and in particular the position of the real indicator trajectory at which the indicator body part is located is determined. On the basis of this, and on the basis of the correlation data, the (probable) position of the body part to be irradiated is then calculated, and this position can be fed to the control device as control data.

Embodiments of the invention are described below. Features of different embodiments may be combined with one another. The embodiments disclose further advantageous features.

Below, the term "4D CT" is mentioned by way of example for the pre-analysis data. A 4D CT is a four-dimensional CT, with three dimensions referring to space and one dimension referring to time. An indicator body part is designated below the tumor position indicator (TPI) by way of example, since according to an embodiment the indicator body part is to be used to determine and thus "display" the position of a body part to be irradiated, in particular a tumor. The tumor position indicator is a structure that, as a result of the action thereof or of the vital parameters thereof, that is as a result of the same activator (frequently respiration, for example, but also heartbeat), moves in the same way as the body part to be irradiated (the tumor). During the irradiation procedure, according to an embodiment X-ray equipment is used to subject the region of the body in which the tumor is located to X-ray analysis (in particular two-dimensional X-ray analysis), that is to obtain two-dimensional X-ray images that are obtained in particular from different recording directions. However, frequently the tumor itself is not visible in these X-ray images. For this reason, an indicator is intended to help to determine the position of the non-visible tumor from the position of the indicator. According to the invention, preferably the best tumor position indicator (TPI) is determined fully automatically and in particular a correlation between the position of the TPI and the position of the body part to be irradiated (also designated the "target" herein) is calculated fully automatically. Preferably, an X-ray image sequence that represents an example of images described by (real) inter-analysis data is generated just before treatment in order to update—that is, if necessary modify—the correlation that has already been determined, in order in this way to obtain the inter-correlation. The determined correlation (inter-correlation) describes the relationship between the position of the TPI and the position of the target, for example as a function and/or in tabular form.

In particular, the invention (e.g. the method according to the invention, the program according to the invention, the computer according to the invention or the treatment system according to the invention) makes use of the following data: 4D CT (for initialization, that is for the preparatory calculation of the correlation) and in particular in addition the X-ray image sequence (real inter-analysis data), which is in particular obtained just before the actual treatment procedure to update if necessary the correlation determined during initialization (pre-correlation) in order in this way to obtain the inter-correlation.

DETAILED DESCRIPTION OF THE INVENTION

Figure 1:
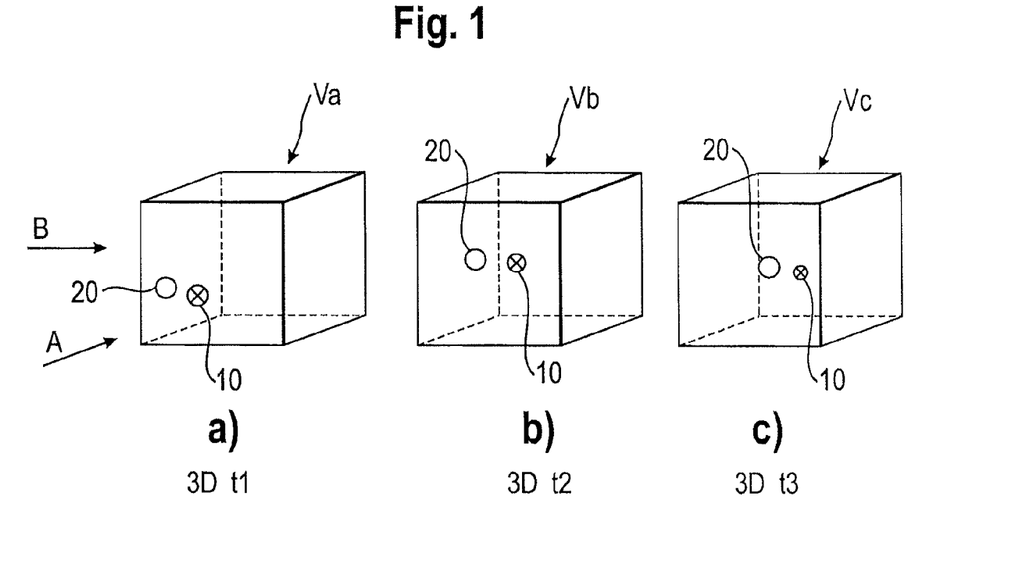
FIG. 1 shows, in sections a) to c), the volumes of a sequence of three-dimensional pre-analysis images.

FIG. 1 shows three volumes, Va, Vb and Vc, of a sequence of three-dimensional pre-analysis images, in particular from a 4D CT. The tumor 10 is marked in each image by an x and occupies part of the analysis volume Va, Vb and Vc. Between the point in time t1 and the point in time t2, and between the point in time t2 and the point in time t3, the tumor 10 moves along a trajectory (pre-target trajectory), which is in particular a closed system and is in particular caused by vital movement. Close to the tumor 10 there is a candidate body part 20 that is marked by a circle and may potentially be used as a tumor position indicator (TPI), that is to say as an indicator body part, and occupies part of the analysis volume, in other words a partial volume (VOI). This candidate body part 20 also performs a vital movement along a candidate trajectory in three-dimensional space. Thus, it changes position between the point in time t1 (FIG. 1a) and the point in time t2 (FIG. 1b), and again between FIG. 1b (point in time t2) and FIG. 1c (point in time t3).

Thus, three-dimensional trajectories for the tumor 10 and the candidate body part 20 can be determined in three-dimensional space on the basis of the pre-analysis data. According to an embodiment, a three-dimensional trajectory (pre-target trajectory) for the tumor 10 is determined. The procedure regarding the candidate body part is as follows.

Figure 2:
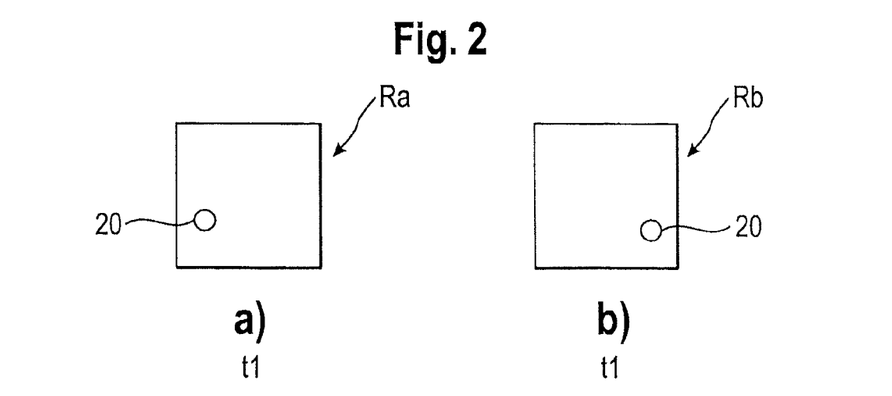
FIG. 2 shows, in sections a) and b), two-dimensional pre-analysis images.

FIG. 2 shows two-dimensional pre-analysis images, which may be for example DRRs. According to an embodiment, the two-dimensional analytical images Ra and Rb, as shown in FIGS. 2a and 2b, are determined at the different points in time associated with each three-dimensional image of the analysis volumes Va, Vb and Vc. The two-dimensional analytical image Ra represents the situation at the same point in time t1 as the two-dimensional analytical image Rb. However, the two-dimensional analytical images Ra and Rb were calculated assuming different analytical conditions. For Ra, a recording direction A is assumed which is different from the recording direction B that was used to calculate the analytical image Rb from the three-dimensional pre-analysis data. The recording directions A and B are indicated in FIG. 1a. The recording direction A is a plan view of the front side of the analysis volume Va, and the recording direction B is a plan view of the side of the analysis volume Va that is on the left in FIG. 1a. At each point in time in the sequence of three-dimensional analytical images, in particular at the points t1, t2 and t3, a two-dimensional analytical image (DRR) is simulated in particular for both recording directions, such that for both recording directions a respective DRR sequence is produced. The abbreviation DRR stands for "digitally reconstructed radiographs" or "digitally rendered radiographs". The two-dimensional candidate body parts 20 in FIGS. 2a and 2b represent the same candidate body part, namely the candidate body part 20 in FIG. 1a. The two-dimensional body parts occupy a partial region (ROI) of the analytical images Ra and Rb.

Because the two-dimensional analytical images Ra and Rb have been obtained from different recording directions (A and B), the position of the candidate body part 20 in three-dimensional space may be determined on the basis of the known analytical conditions (recording directions) and the position of the candidate body part 20 in the two-dimensional analytical images Ra and Rb, in particular by rearward extrapolation. This determined position is in agreement with the position of the candidate body part 20 shown in FIG. 1a.

The two-dimensional analytical images shown in FIG. 2 represent simulated analytical images. These images correspond to images generated during the irradiation procedure. Preferably, a tracking algorithm is applied to these two-dimensional simulated analytical images, or to be more precise to these two-dimensional image sequences, to track the partial region 20 in the other two-dimensional images of the sequence. The partial region 20 is also designated ROI (region of interest) below. The ROI 20 is the two-dimensional version of the volume VOI 20 in FIG. 1. A tracking algorithm of this kind is disclosed for example in EP 08 169 422.6 or the corresponding U.S. application US-61/150,148. The content thereof is included herein by reference. In this way, it is possible to determine the respective position of the corresponding VOI for the two two-dimensional sequences of analytical images. If the ROIs are trackable on the basis of the DRRs, it is probable that there is trackability during the actual irradiation procedure as well. A partial volume 20 of this kind, or an ROI 20 of this kind, is thus suitable as a candidate body part. It is also possible to compare the three-dimensional candidate trajectory produced from the two-dimensional DRRs with the three-dimensional trajectory produced from the three-dimensional pre-analysis images, that is to say the sequence of volumes Va, Vb, Vc etc. If there is agreement in the trajectory, this supports the view that the result of tracking has validity. If there is no agreement in the trajectory, the corresponding candidate body part can be rejected, that is to say not used as the indicator body part.

Figure 3:
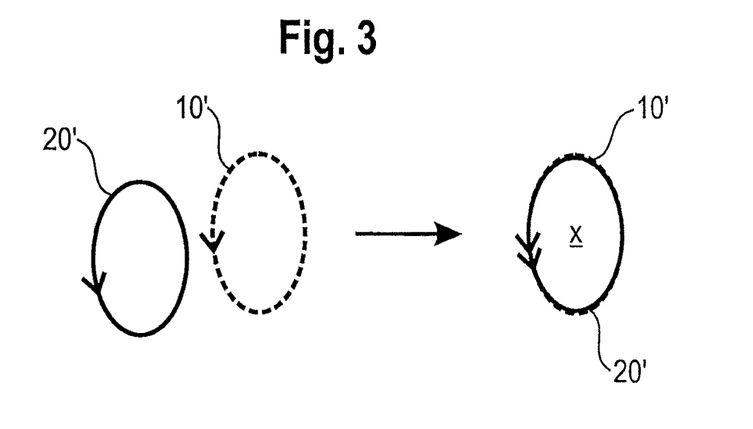
FIG. 3 illustrates an exemplary normalization of trajectories, where the center gravity for each is overlaid with each other.

Further, the procedure for selecting a candidate body part as the indicator body part may in particular be as follows. The resulting three-dimensional trajectory (e.g. that trajectory resulting from the rearward extrapolation based on the two-dimensional sequences) is compared with the three-dimensional tumor trajectory resulting from the 4D CT. In particular, the correlation between the two trajectories, that is the similarity between the trajectories, is determined. To determine the similarity, the two trajectories may for example be "normalized". This means that the center of gravity (the center of their movement) is overlaid. This is shown diagrammatically in FIG. 3. 20' shows the trajectory (candidate trajectory) of the candidate body part, and 10' shows the trajectory (pre-target trajectory) of the tumor. To the right of the arrow, the two trajectories are shown overlaid, extending around the common center of gravity x. The extent of similarity can be determined from the deviations between the two overlaid trajectories 10' and 20'.

According to an embodiment, from a plurality of possible candidate trajectories the one that correlates most closely to the tumor trajectory (pre-target trajectory) is selected.

Figure 4:
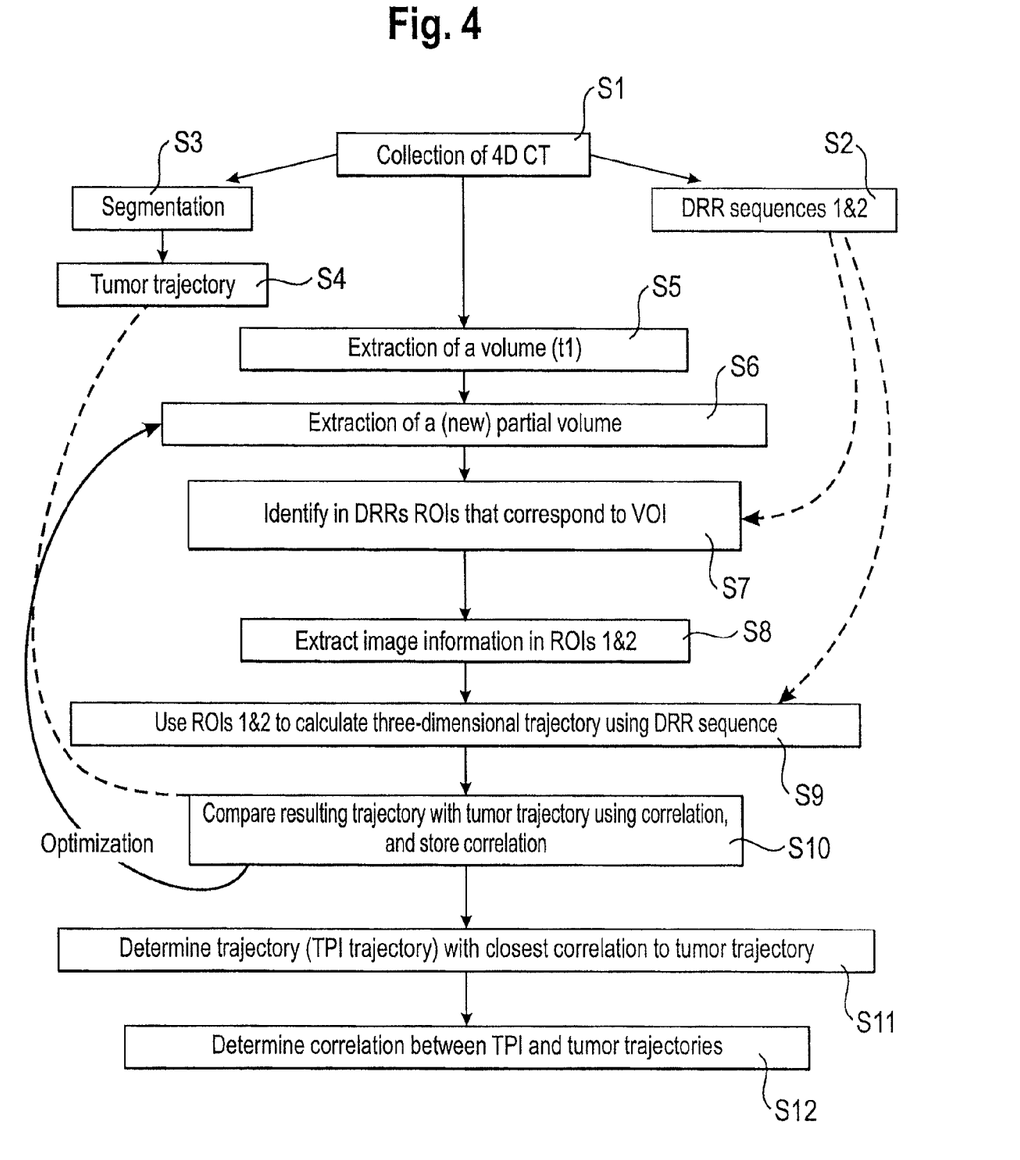
FIG. 4 shows diagrammatically how a candidate trajectory and the correlation are determined using the pre-analysis data (4D CT data) in accordance with an embodiment of the invention.

FIG. 4 shows diagrammatically how a candidate trajectory and the correlation are determined using the pre-analysis data (4D CT data).

In step S1, the 4D CT data (pre-analysis data) is collected. From this 4D CT data, two DRR sequences 1 and 2 (simulated inter-analysis data) are determined (step S2) and the 4D CT data is further segmented in step S3. This means that the analysis volumes Va, Vb and Vc are extracted from the three-dimensional sequence (4D CT images) from different points in time. The extracted analysis volumes Va, Vb and Vc that contain the tumor 10 are linked to form the tumor trajectory 10' (pre-target trajectory) in step S4. The collected 4D CT data is also used to determine a candidate body part 20. For this purpose, a partial volume corresponding to the candidate body part 20 is selected for a point in time in the three-dimensional sequence represented by the 4D CT data. This partial volume may be selected with the aid of a search algorithm that, for example, selects partial volumes that contrast one another particularly highly. However, it is also possible to scan the entire three-dimensional analysis volume Va step by step for partial volumes such that ultimately the partial volumes that are contained in the analysis volume Va or that, taken together, fill the analysis volume Va, are checked for suitability as an indicator body part. According to step S5, an analysis volume Va is thus selected from the sequence of analysis volumes Va, Vb and Vc that are described by the 4D CT data. This analysis volume Va corresponds to the condition at a particular point in time, e.g. the point t1. Then, in step S6, a partial volume that corresponds to the candidate body part 20 is selected, either freely or with the aid of a search algorithm (optimizer). Here, for example those volumes that are in the vicinity of the tumor 10 may be preferred. This partial volume (candidate body part 20) thus also describes the condition at the point in time t1.

In the next step S7, an ROI that corresponds to the VOI is determined in each of the DRR images 1 and 2 that prevailed at the point in time t1. The DRRs are determined on the basis of the analytical conditions.

In the next step S8, the image information contained in the respective ROIs is then extracted.

In step S9, the extracted image information is then used to identify a respective similar ROI in the DRR sequence and so to track the ROIs, as described for example in the above-mentioned EP 08 169 422.6 or the corresponding U.S. application 61/150,148. Once a sequence of ROIs is obtained for each of the two DRR sequences 1 and 2, it is possible to use rearward extrapolation based on the analytical conditions to calculate a three-dimensional trajectory based on the DRR sequences (step S9). According to a variant on the invention, this three-dimensional trajectory may be compared with a three-dimensional trajectory that was determined on the direct basis of the 4D CT data and that represents the trajectory of the VOIs. If this trajectory is in agreement or a particular extent of similarity describing the similarity between the trajectories is exceeded, this supports using the trajectory as the candidate trajectory and in particular selecting it as the indicator trajectory. However, this step is purely optional. In the next step, S10, the three-dimensional candidate trajectory resulting from the DRR sequence is compared with the three-dimensional tumor trajectory determined in step S4. The comparison in particular includes determining the correlation and in particular storing it. Thereafter, the procedure returns to step S6 and a new partial volume VOI is extracted, and steps S7, S8, S9 and S10 are repeated with this new extracted partial volume. This is reiterated for example until the entire analysis volume Va that was extracted from the sequence in step S5 has been scanned with the partial volumes. Then, in step S11 a determination is carried out of which partial volume VOI produces the closest correlation between the determined candidate trajectory and the tumor trajectory (pre-target trajectory). The candidate trajectory (TPI trajectory) that shows the closest correlation is selected. This selected candidate trajectory is the indicator trajectory.

In step S12, the correlation determined for the indicator trajectory is then output, and on the basis thereof the position of the tumor can be determined.

Figure 5:
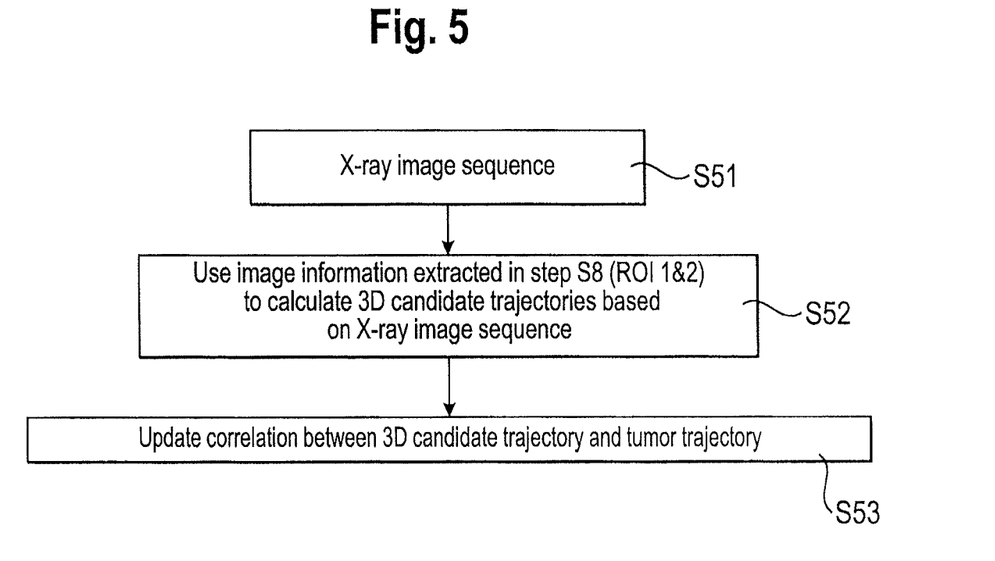
FIG. 5 shows optional steps that can be included with a method according to an embodiment of the invention.

FIG. 5 shows an optional addition to the method, according to an embodiment. In this embodiment, X-ray images that form an X-ray image sequence (real inter-analysis data) are generated in particular just before the actual irradiation procedure. In particular, these are generated once more in at least two different recording directions, in known recording conditions (analytical conditions). This is performed in step S51. Then, in step S52, the image information of ROIs 1 and 2, which was already extracted in step S8, is used to find corresponding partial regions in the (two) X-ray images that apply at a determined point in time in the sequence. These identified partial regions are then in turn tracked using the tracking algorithm, this tracking algorithm then being applied to the X-ray image sequence obtained just before irradiation. Once two respective two-dimensional candidate trajectories are available, it is possible to calculate a three-dimensional trajectory that represents a three-dimensional candidate trajectory, once again on the basis of the recording conditions (analytical conditions).

In step S53, based on the newly calculated three-dimensional candidate trajectory, the correlation (inter-correlation) between this candidate trajectory and the tumor trajectory is then calculated, and in particular a correlation that was calculated previously is updated or the correlation is re-calculated. In particular, the result of the pre-indicator trajectory is used in the determination, in particular the re-calculation, of the correlation. In particular, this includes displacement and deformation (see FIG. 6 in relation to the pre-indicator trajectory).

Step S9 in FIG. 4 is optional. The method of FIG. 4 is preferably used to re-calculate the correlation in particular of only those ROIs for which the method of FIG. 4 gave promising results, as described below.

Figure 6:
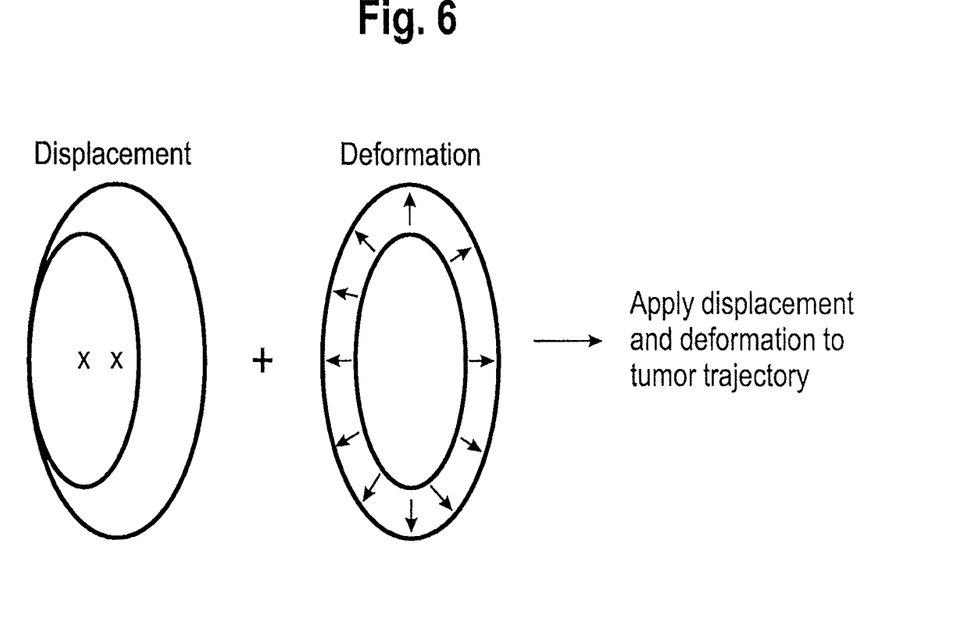
FIG. 6 describes a change in the candidate trajectory by adding a displacement and a deformation.
Figure 7:
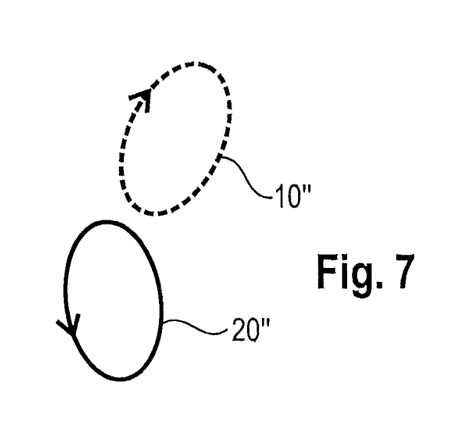

Step S9 in FIG. 4 is optional in particular for re-calculating the correlation. The method of FIG. 4 is preferably used to re-calculate the correlation in particular of only those ROIs for which the method of FIG. 4 gave promising results, as described below. The method of FIG. 4 is in particular used to make a pre-selection of possible candidate body parts (in particular VOIs or ROIs). For these pre-selected ROIs (or VOIs), the method of FIG. 5 is then performed. Preferably, step S53 in FIG. 5 determines how the candidate trajectory determined on the basis of the pre-analysis data (DRRs) has changed by comparison with the candidate trajectory that results from the inter-analysis data (the X-ray image sequence of step S51). This determined change is described for example by the addition of a displacement and a deformation, as shown in FIG. 6. In FIG. 6 the displacement of the x-marked center of gravity is shown to the left of the plus sign, and the deformation (broadening) of the trajectory is shown to the right of the plus sign. The change that is determined in this way (e.g. combination of displacement and deformation) is then also applied to the pre-target trajectory (tumor trajectory) in accordance with an embodiment. It is thus assumed that the trajectory of the body part to be irradiated (tumor) changes in a way corresponding to the change in the candidate trajectory. FIG. 7 shows the possible case in which the candidate body part moves in the opposite direction to the body part to be irradiated (tumor). The two trajectories are marked 20" and 10". In this case too, the correlation between the trajectories can be determined, that is to say in general terms the mutual information. In particular, a measure of similarity between the two trajectories can be determined and used as the basis for determining the correlation. In particular, a deformation model that was obtained for example from elastic registration may be of help. For the trajectory adjustment, in particular the mutual information is taken from information theory (http://en.wikipedia.org/wiki/Mutual_information), which is taken in particular as a measure of similarity.

Regarding the deformation model: using the pre-analysis data (4D CT), it is possible to generate a deformation model of the anatomical body part (e.g. the lung) that is subject to vital movement, by way of image-based elastic fusion. On this basis, the extent to which the body part subject to vital movement (e.g. the lung) is deformed in various anatomical regions beyond the vital cycle (e.g. the respiratory cycle) is calculated. The calculated information on the deformation is then preferably used to determine (in particular to re-calculate or update) the correlation model, in particular in step S53.

The invention claimed is:

1. A computer-implemented method for determining an indicator body part subject to vital movement that is not to be irradiated and that serves as an indicator of the change in position of a body part subject to vital movement that is to be irradiated, and/or for determining an indicator trajectory that describes the vital movement of the indicator body part, comprising:

a) providing pre-analysis data, that describes with temporal resolution in a three-dimensional space positions of the body part subject to vital movement that is to be irradiated and are changed by a vital movement, and positions of at least one candidate body part that is not to be irradiated, said pre-analysis data obtained prior to irradiation;

b) determining, using a computer, a pre-target trajectory that describes a vital movement performed by the body part subject to vital movement that is to be irradiated, wherein determining the pre-target trajectory is based on the pre-analysis data;

c) simulating data referred to as inter-analysis data, the inter-analysis data being image data to be generated during irradiation by a medical analytical imaging method, the simulation being based on the pre-analysis data, wherein the inter-analysis data describes changing positions of at least some of a plurality of the body parts that are not to be irradiated, the inter-analysis data describing the changing positions at least at certain times during irradiation at different points in time, the simulated inter-analysis data being used by at least one of the two steps d) and e);

d) determining, using a computer, at least one candidate trajectory that describes the positions of at least one of the at least one candidate body part that is not to be irradiated, wherein determining the at least one candidate trajectory is based on the pre-analysis data; and e) determining, based on the at least one candidate trajectory and the pre-target trajectory, at least one of the at least one candidate body part as an indicator body part and/or one of the at least one candidate trajectory as a pre-indicator trajectory, or determining, based on the at least one candidate trajectory and the pre-target trajectory, the fact that none of the candidate body parts may be determined as an indicator body part and/or none of the candidate trajectories may be determined as a pre-indicator trajectory.

2. A method according to claim 1, wherein the at least one candidate trajectory is determined directly from the pre-analysis data or wherein determining at least one candidate trajectory includes determining the at least one candidate trajectory based on the simulated inter-analysis data.

3. A determination method according to claim 2, comprising:
applying a tracking method to the simulated inter-analysis data that serves to track body parts during their vital movement and is intended to be applied to actual inter-analysis data that was obtained during an irradiation procedure or directly before the irradiation procedure;
wherein only those body parts that are not to be irradiated and are trackable by the tracking method applied to the simulated inter-analysis data are used for determination as a pre-indicator body part.

4. A method according to claim 1, comprising:
simulating inter-analysis data based on the pre-analysis data, wherein
the inter-analysis data describes changing positions of at least some of a plurality of the body parts that are not to be irradiated, at least at certain times during irradiation at different points in time, and the simulated inter-analysis data is two-dimensional and describes in a surface, with temporal resolution, the positions of at least some of the plurality of the body parts subject to vital movement that are not to be irradiated, at least at certain times;
determining the at least one candidate trajectory based on the simulated inter-analysis data;

wherein the at least one candidate trajectory is or includes a two-dimensional candidate trajectory and describes the vital movement of the at least one candidate body part in the surface.

5. A method according to claim 3, wherein determining the at least one candidate trajectory includes applying the tracking method to the simulated inter-analysis data.

6. A method according to claim 4, wherein determining the at least one candidate trajectory includes applying a tracking method to the simulated inter-analysis data.

7. A method according to claim 1, comprising:
simulating inter-analysis data based on the pre-analysis data, wherein the inter-analysis data is simulated on the basis of the pre-analysis data;
applying a tracking method to the simulated inter-analysis data that serves to track body parts during their vital movement and is intended to be applied to actual inter-analysis data that was obtained during an irradiation procedure or directly before the irradiation procedure,
wherein only those body parts that are not to be irradiated and are trackable by the tracking method applied to the simulated inter-analysis data are used for determination as a pre-indicator body part, and
wherein
the inter-analysis data describes changing positions of at least some of a plurality of the body parts that are not to be irradiated, at least at certain times during irradiation at different points in time;
determining the at least one candidate trajectory based on the simulated inter-analysis data, wherein
the simulated inter-analysis data is two-dimensional and describes in a surface, with temporal resolution, the positions of at least some of the plurality of the body parts subject to vital movement that are not to be irradiated, at least at certain times,
the at least one candidate trajectory is or includes a two-dimensional candidate trajectory and describes the vital movement of the at least one candidate body part in the surface;
the simulated inter-analysis data includes first and second two-dimensional simulated inter-analysis data that is simulated on the basis of the pre-analysis data assuming inter-analysis conditions, wherein the inter-analysis conditions describe a first and a second planned recording direction in which first and second two-dimensional actual analytical data is to be obtained during an actual inter-analysis procedure that takes place during irradiation;
applying the tracking method to the first and second two-dimensional inter-analysis data; and
using only those of the candidate body parts that are trackable and that cannot be generated by moving a single body part in three-dimensional space, taking into account the inter-analysis conditions, for determination as a pre-indicator body part for which first and second candidate trajectories are produced.

8. A method according to claim 1, comprising:
determining, based on a comparison of the at least one candidate trajectory with the pre-target trajectory, whether there is a correlation between the at least one candidate trajectory and the pre-target trajectory; and
based on a closeness of the determined correlation, determining one of the at least one candidate body parts as a pre-indicator body part and/or determining one of the at least one candidate trajectories as a pre-indicator trajectory.

9. A computer-implemented method for correcting a determined correlation, comprising:
  providing pre-analysis data, which describes with temporal resolution in a three-dimensional space positions of a body part subject to vital movement that is to be irradiated that are changed by a vital movement, and positions of at least one candidate body part that is not to be irradiated, said pre-analysis data obtained prior to irradiation;
  determining, using a computer, a pre-target trajectory that describes a vital movement performed by the body part subject to vital movement that is to be irradiated, wherein determining the pre-target trajectory is based on the pre-analysis data;
  determining, using a computer, at least one candidate trajectory that describes the positions of at least one of the at least one candidate body part that is not to be irradiated, wherein determining the at least one candidate trajectory is based on the pre-analysis data;
  on the basis of the at least one candidate trajectory and the pre-target trajectory, determining at least one of the at least one candidate body part as an indicator body part and/or determining one of the at least one candidate trajectory as a pre-indicator trajectory, or
  on the basis of the at least one candidate trajectory and the pre-target trajectory, determining the fact that none of the at least one candidate body part may be a pre-indicator body part and/or none of the at least one candidate trajectory may be a pre-indicator trajectory;
  determining based on a comparison of the at least one candidate trajectory with the pre-target trajectory, whether there is a correlation between the at least one candidate trajectory and the pre-target trajectory; and
  based on a closeness of the determined correlation, selecting one of the at least one candidate body parts as a pre-indicator body part and/or selecting one of the at least one candidate trajectory as a pre-indicator trajectory;
  providing actual inter-analysis data that was obtained before or during irradiation, and
  correcting the determined correlation between the at least one candidate trajectory and the pre-target trajectory based on the inter-analysis data.

10. A method according to claim 9, comprising:-determining a deviation between the at least one determined pre-indicator trajectory and an at least one inter-indicator trajectory that corresponds thereto but is determined on the basis of the actual inter-analysis data; and
  correcting the correlation based on the determined deviation between the at least one determined pre-indicator trajectory and the at least one inter-indicator trajectory.

11. A computer-implemented method for correcting a determined correlation, comprising:
  providing pre-analysis data, that describes with temporal resolution in a three-dimensional space positions of a body part subject to vital movement that is to be irradiated that are changed by a vital movement, and positions of at least one candidate body part that is not to be irradiated, wherein the pre-analysis data is obtained prior to irradiation;
  determining, using a computer, a pre-target trajectory that describes a vital movement performed by the body part subject to vital movement that is to be irradiated, wherein determining the pre-target trajectory is based on the pre-analysis data;
  determining, using a computer, at least one candidate trajectory that describes the positions of at least one of the at least one candidate body part that are not to be irradiated, wherein determining the at least one candidate trajectory is based on the pre-analysis data;
  on the basis of the at least one candidate trajectory and the pre-target trajectory, determining at least one of the at least one candidate body part as an indicator body part and/or determining one of the at least one candidate trajectory as a pre-indicator trajectory, or
  on the basis of the at least one candidate trajectory and the pre-target trajectory, determining the fact that none of the at least one candidate body part may be determined as a pre-indicator body part and/or determining none of the candidate trajectory may be determined as a pre-indicator trajectory;
  determining based on a comparison of the at least one candidate trajectory with the pre-target trajectory, whether there is a correlation between the at least one candidate trajectory and the pre-target trajectory; and
  based on a closeness of the determined correlation, selecting one of the at least one candidate body part as a pre-indicator body part and/or selecting one of the at least one candidate trajectory as a pre-indicator trajectory;
  providing pre-data of vital functions that describes vital parameters that were detected on obtaining the pre-analysis data;
  providing inter-data of vital functions that describes vital parameters that were detected on obtaining actual inter-analysis data,
  wherein the at least one determined pre-indicator trajectory is corrected on the basis of the pre-data of vital functions and the inter-data of vital functions in order to determine at least one vital indicator trajectory; and
  correcting the correlation based on the at least one vital indicator trajectory.

12. A computer-implemented method for correcting a determined correlation, comprising:
  providing pre-analysis data that, describes with temporal resolution in a three-dimensional space positions of a body part subject to vital movement that is to be irradiated that are changed by a vital movement, and positions of at least one candidate body part that is not to be irradiated, wherein the pre-analysis data is obtained prior to irradiation;
  determining, using a computer, a pre-target trajectory that describes a vital movement performed by the body part subject to vital movement that is to be irradiated, wherein determining the pre-target trajectory is based on the pre-analysis data;
  determining, using a computer, at least one candidate trajectory that describes the positions of at least one of the at least one candidate body part that is not to be irradiated, wherein determining the at least one candidate trajectory is based on the pre-analysis data;
  on the basis of the at least one candidate trajectory and the pre-target trajectory, determining at least one of the at least one candidate body part as an indicator body part and/or determining one of the at least one candidate trajectory as a pre-indicator trajectory, or
  on the basis of the at least one candidate trajectory and the pre-target trajectory, determining the fact that none of the at least one candidate body part may be determined as a pre-indicator body part and/or determining none of the candidate trajectory may be determined as a pre-indicator trajectory;

based on a comparison of the at least one candidate trajectory with the pre-target trajectory, determining a correlation between the at least one candidate trajectory and the pre-target trajectory;

based on a closeness of the determined correlation, selecting one of the at least one candidate body parts, as a pre-indicator body part and/or selecting one of the at least one candidate trajectory, as a pre-indicator trajectory;

providing actual inter-analysis data that was obtained before or during irradiation, and correcting the determined correlation based on the actual inter-analysis data;

determining a deviation between the at least one determined pre-indicator trajectory and an at least one inter-indicator trajectory that corresponds thereto but the actual inter-analysis data, and correcting the correlation based on the determined deviation between the at least one determined pre-indicator trajectory and an at least one inter-indicator trajectory.

13. A method according to claim 11, comprising:
comparing the pre-data of vital functions with the inter-data of vital functions, and
based on the comparison, outputting alerts.

14. A method according to claim 12, comprising:
providing pre-data of vital functions that describes vital parameters that were detected on obtaining the pre-analysis data;
providing inter-data of vital functions that describes vital parameters that were detected on obtaining actual inter-analysis data;
comparing the pre-data of vital functions with the inter-data of vital functions, and
based on the comparison, outputting alerts.

15. A non-transitory computer readable medium comprising computer executable instructions adapted to perform the method in accordance with claim 14.

16. A treatment beam system, having
a treatment device that is constructed to emit a treatment beam;
a computer including a memory, a control interface and a user interface, wherein stored in the memory is the computer program according to claim 15; and
a control device for controlling the position of the treatment beam on the basis of control data received from the control interface.

* * * * *